United States Patent
Sobel et al.

(10) Patent No.: US 6,785,818 B1
(45) Date of Patent: Aug. 31, 2004

(54) THWARTING MALICIOUS REGISTRY MAPPING MODIFICATIONS AND MAP-LOADED MODULE MASQUERADE ATTACKS

(75) Inventors: William E. Sobel, Stevenson Ranch, CA (US); David Grawrock, Aloha, OR (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/483,536

(22) Filed: Jan. 14, 2000

(51) Int. Cl.$^7$ .......................... G06F 12/14; H04L 12/22
(52) U.S. Cl. ...................................... 713/200; 713/187
(58) Field of Search ................................ 713/188, 189, 713/200, 201; 714/38

(56) References Cited

U.S. PATENT DOCUMENTS

| | | | |
|---|---|---|---|
| 5,572,590 A | 11/1996 | Chess | 380/4 |
| 5,974,549 A * | 10/1999 | Golan | 713/200 |
| 6,092,194 A * | 7/2000 | Touboul | 713/200 |
| 2002/0035693 A1 * | 3/2002 | Eyres et al. | 713/189 |
| 2002/0073046 A1 * | 6/2002 | David | 705/67 |
| 2002/0178375 A1 * | 11/2002 | Whittaker et al. | 713/200 |
| 2002/0194488 A1 * | 12/2002 | Comack et al. | 713/200 |
| 2003/0115458 A1 * | 6/2003 | Song | 713/165 |
| 2003/0115479 A1 * | 6/2003 | Edwards et al. | 713/200 |

FOREIGN PATENT DOCUMENTS

| | | | |
|---|---|---|---|
| EP | 0 636 977 A2 | 2/1995 | G06F/11/00 |
| WO | WO 93 25024 A1 | 12/1993 | H04L/9/00 |
| WO | WO 99 15966 A1 | 4/1999 | G06F/11/00 |

* cited by examiner

*Primary Examiner*—Gilberto Barron
*Assistant Examiner*—James Curcio
(74) *Attorney, Agent, or Firm*—Fenwick & West LLP

(57) ABSTRACT

Apparati, computer-implemented methods, and computer-readable media for thwarting map-loaded module (8) attacks on a digital computer (1). Within the computer (1) is an intermediate location such as a registry (10) containing mappings from generic names (4) of map-loaded modules (8) to specific locations (5) of the map-loaded modules (8). Coupled to the intermediate location (10) is a monitor module (20) adapted to monitor attempts to replace existing mappings (5) of map-loaded modules (8) with replacement mappings (5). Coupled to the map-loaded modules (8) is a file system monitor;module (70) adapted to monitor attempts to insert new map-loaded modules (8) into the computer (1). Coupled to the monitor module (20) and to the file system monitor module (70) is a programmable control module (30) adapted to determine when a change in mapping constitutes a malicious code attack.

19 Claims, 3 Drawing Sheets

THWARTING MALICIOUS REGISTRY MAPPING MODIFICATIONS AND MAP-LOADED MODULE MASQUERADE ATTACKS

TECHNICAL FIELD

This invention pertains to the field of thwarting attacks on digital computers caused by malicious computer code entering the computers via map-loaded modules.

BACKGROUND ART

Since this technical field is new, there are no known items of background art relevant to the problem solved by this invention.

DISCLOSURE OF INVENTION

The present invention is an apparatus, computer-implemented method, and computer-readable medium comprising a registry (10) containing mappings from generic map-loaded module names (4) to locations (5) of specific map-loaded modules (8). Coupled to the registry (10) is a registry monitor module (20) adapted to monitor attempts to replace existing mappings (5) of map-loaded modules (8) with replacement mappings (5). Coupled to the map-loaded modules (8) is a file system monitor module (70) adapted to monitor attempts to insert new map-loaded modules (8) into the computer (1). Coupled to the registry monitor module (20) and to the file system monitor module (70) is a programmable control module (30) adapted to determine that a change in mapping is deemed to constitute a malicious code attack when at least one pre-established rule (50) is satisfied.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
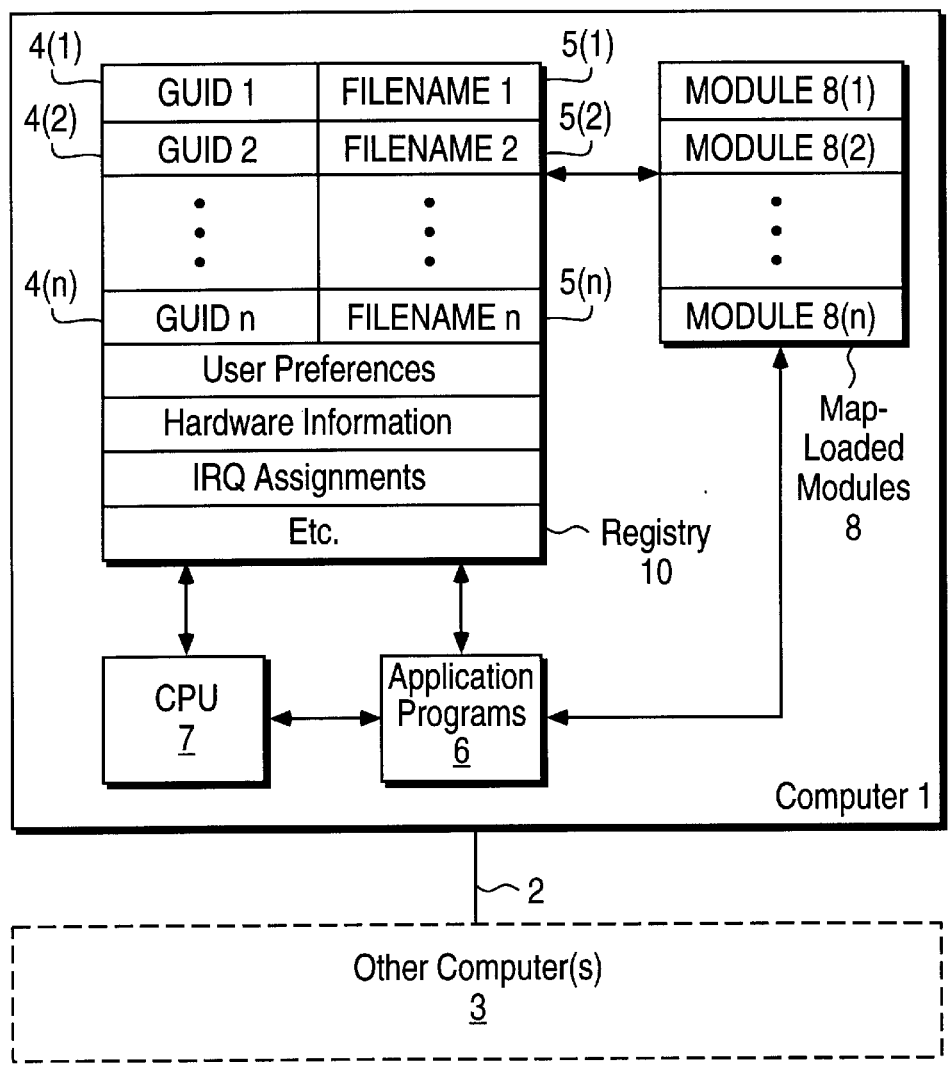
FIG. 1 is a block diagram illustrating a computer 1 environment in which the present invention has applicability.

FIG. 1 illustrates a computer 1, which may or may not be coupled to one or more other computers 3 via a network 2. Network 2 can be a local area network or a wide area network. It can be a wired network, such as an Ethernet network, or a wireless network. Within computer 1 is a registry 10 storing certain centralized information about the configuration of computer 1. Registry 10 is called the "Systems Registry" when Windows is the operating system installed on computer 1. The registry 10 can defer to a network based store with some configurations such as when using Microsoft Active Directory Services. Registry 10 stores such things as user preferences (e.g., default fonts), hardware information, IRQ (Interrupt Request) assignments, etc. Registry 10 also contains mappings from globally unique identifiers 4 (GUID's) to dynamically addressable locations 5 of map-loaded modules 8. A GUID is typically a 16 byte number contained within a parameter field.

A map-loaded module 8 is a module of executable computer code that can enter a computer system and be invoked by an application program 6 by means of a technique of mapping. "Mapping" means that an intermediate location, in this case registry 10, points to the location 5 of the map-loaded module 8. In the illustrated embodiment, the application program 6 can be one of a set of such programs 6 coupled to the registry 10 and to the central processing unit (CPU) 7 of computer 1.

Examples of map-loaded modules 8 are COM objects and software drivers. COM is an acronym for Component Object Model. It is an architecture description describing how unrelated pieces of code interact with each other. For example, if a word processor application program 6 wants to make use of a spell checker module 6 that is not fully integrated into the word processor 6 (e.g., it is made by a different manufacturer), COM is used to provide handshaking information between the word processor 6 and the spell checker 6.

A software driver is a piece of computer code associated with a hardware device (e.g., a printer, scanner, hard drive, parallel port, etc.) that enables an application program 6.to make use of that hardware device.

FIG. 1 shows a set of n GUIDs 4 and n corresponding locations 5 of map-loaded modules 8. n can be any non-negative integer, subject only to the size constraints of registry 10.

The reason for having a registry 10 containing a set of mappings between GUIDs 4 and locations 5 of map-loaded modules 8 is that this provides flexibility to the users of the application programs 6.

In FIG. 1, the locations 5 of the map-loaded modules are referred to as filenames, i.e., FILENAME1 through FILENAMEn. A filename is a name assigned to a file that is used by the operating system to locate the file. Usually the full pathname is given with the filename, in which case the filename is unique within computer 1. If the pathname is not given with the filename, the operating system makes certain assumptions as to the directory in which the file (in this case, map-loaded module 8) is stored.

By this technique, the locations 5 of the map-loaded modules 8 can be allocated dynamically. That is, said locations can change over time as circumstances warrant. For example, let us suppose that the application program 6 wishes to make use of a printer. In this case, GUID1 can be used to represent the generic concept of "printer". Initially, the printer is a dot matrix printer, and FILENAME1 is set to C:\printers\dotmatrix, the location of a file that contains a software driver 8(i) for a dot matrix printer. Then, when the application program 6 invokes GUID1, registry 10 converts GUID1 into C:\printers\dotmatrix, and the appropriate software driver 8(i) is found and used. Later, the user of computer 1 replaces his or her dot matrix printer with a laser printer. The entry in registry 10 for FILENAME1 is changed to be C:\printers\laser. Then, when the user of the application 6 invokes GUID1, registry 10 converts GUID1 to C:\printers\laser, thereby invoking the appropriate software driver 8(j) for the laser printer. By this technique, the code within the application program 6 does not need to change, even when the new printer is installed. This eliminates the tedious problem of having to revise the code within the application program 6 every time it is decided to use a new piece of hardware (in this case a new printer) with the application program 6.

The downside to the use of registries 10, however, is that it creates a tempting target for a malicious hacker who wants to attack computer 1 via malicious computer code. This malicious computer code can be embodied in a virus, a trojan, or a worm. These species of malicious code are similar, and differ in that viruses and worms can spread themselves, while a trojan requires the user to do something before the trojan is spread. A virus can hijack anything to spread itself, while a worm burrows itself into computer 1. The malicious hacker can try to exploit the power of the dynamic mapping capability of registry 10. For example, if the hacker contaminates FILENAME1 with malicious code, any application program 6 subsequently invoking the map-loaded module 8 to which FILENAME1 points can also be infected.

Newer operating systems, such as Windows NT, have a lock-down feature, in which only the system administrators 40 can change the contents of registry 10. This provides some degree of security. However, in order for this lock-down feature to work, computer 1 has to be correctly configured. In many, if not most, cases, computer 1 is not correctly configured, due to the complexity of doing so. Furthermore, in older operating systems, such as Windows 95, there is no lock-down feature.

What is needed therefore is a method, apparatus, and computer-implemented medium that can thwart malicious code attacks using map-loaded modules 8. Such attacks can be referred to as "masquerade" attacks, because the hacker uses a malicious map-loaded module 8 to masquerade as a legitimate module 8.

Figure 2:
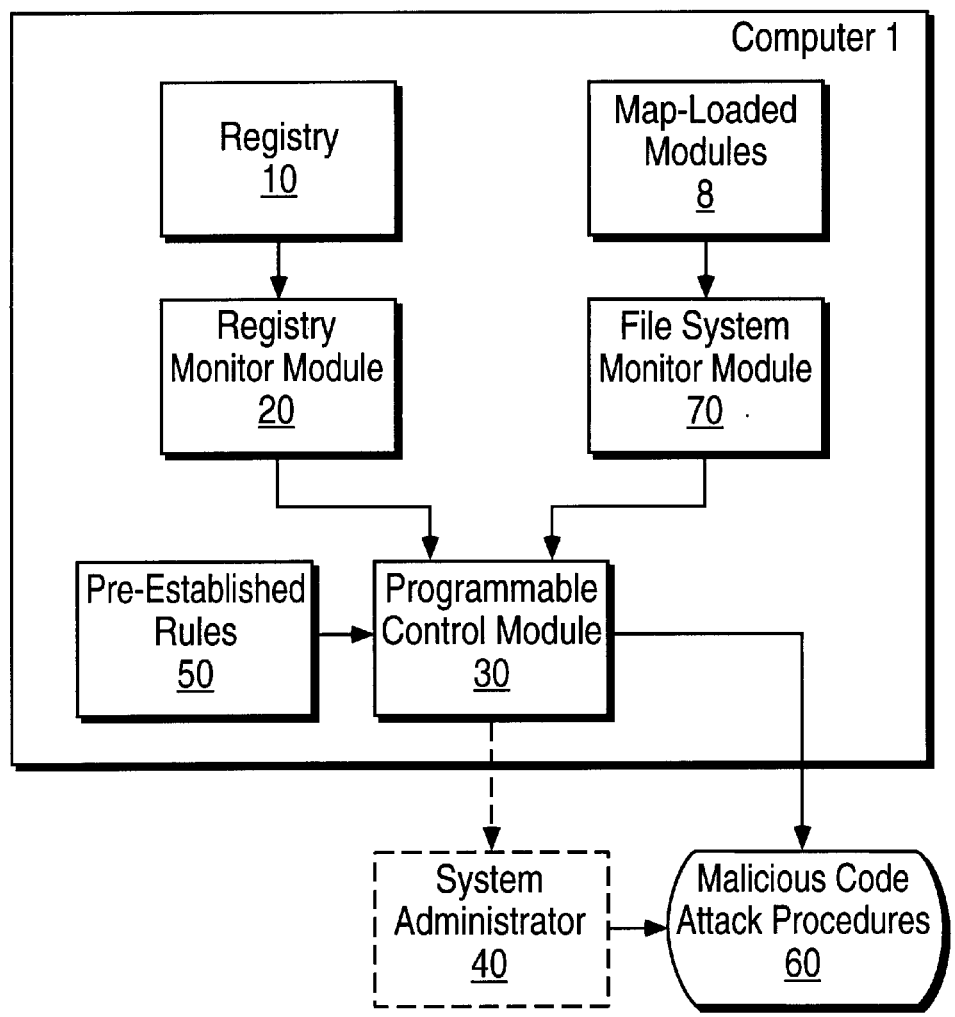
FIG. 2 is a high level block diagram showing the modules 20, 30 of the present invention.

Referring to FIG. 2, it can be seen that the present invention makes use of a registry monitor module 20 coupled to the registry 10, a file system monitor module 70 coupled to the map-loaded modules 8, and a programmable control module 30 coupled to the registry monitor module 20 and to the file system monitor module 70. Modules 20, 30, and 70 can be implemented in hardware, firmware, and/or software, and are contained in a storage medium associated with computer 1. File system monitor module 70 and registry monitor module 20 monitor changes in map-pings of map-loaded modules 8 that occur within computer 1. These changes in mappings can be of two kinds: a first kind (monitored by file system monitor module 70) in which the change in mapping is an attempt to insert a new map-loaded module 8 into the computer 1, and a second kind (monitored by registry monitor module 20) in which the change in mapping is an attempt to replace an existing mapping 5 of a map-loaded module 8 with a replacement mapping 5. For the first kind, a module 8 changes while the mapping 5 to it stays the same. For the second kind, the mapping 5 is changed while the modules stay the same. For each kind, the present invention assumes that such a change in mapping constitutes potentially suspicious activity worthy of further investigation.

Programmable control module 30 applies one or more pre-established rules 50 to the change in mapping once registry monitor module 20 or file system monitor module 70 has informed programmable control module 30 that a change in mapping has occurred. Rules 50 are contained in a storage medium associated with computer 1. Generally speaking, there are two types of rules 50 invoked by programmable control module 30: a first type of rule 50 for which it has been pre-determined that programmable control module 30 can decide for itself that a malicious code attack has occurred when such a rule 50 has been satisfied, and a second type of rule 50 for which it has been determined in advance that programmable control module 30 should be given some help. For this second type of rule 50, programmable control module 30 passes control to a human system administrator 40 to make the determination as to whether a malicious code attack has actually occurred. When module 30 or administrator 40 determines that a malicious code attack has occurred, control is typically passed to a set of malicious code attack procedures 60. Such procedures 60 can comprise means to try to purge computer 1 of the malicious code that has been found, and/or alert other computers 3 of the attack, according to conventional techniques in the art.

Any number of rules 50 can be used, either alone or in combination, to make the determination that a malicious code attack has occurred. Similarly, the set of rules 50 can be divided up into type 1 and type 2 in any fashion. For example, in one installation all of the rules 50 may be predetermined to be type 1 rules, i.e., those for which module 30 can make its own decisions. In a second installation, all of the rules 50 may be predetermined to be type 2 rules i.e., a system administrator 40 is required to make a decision. In a third installation, some of the rules are pre-determined to be type 1 rules and some of the rules 50 are pre-determined to be type 2 rules.

Figure 3:
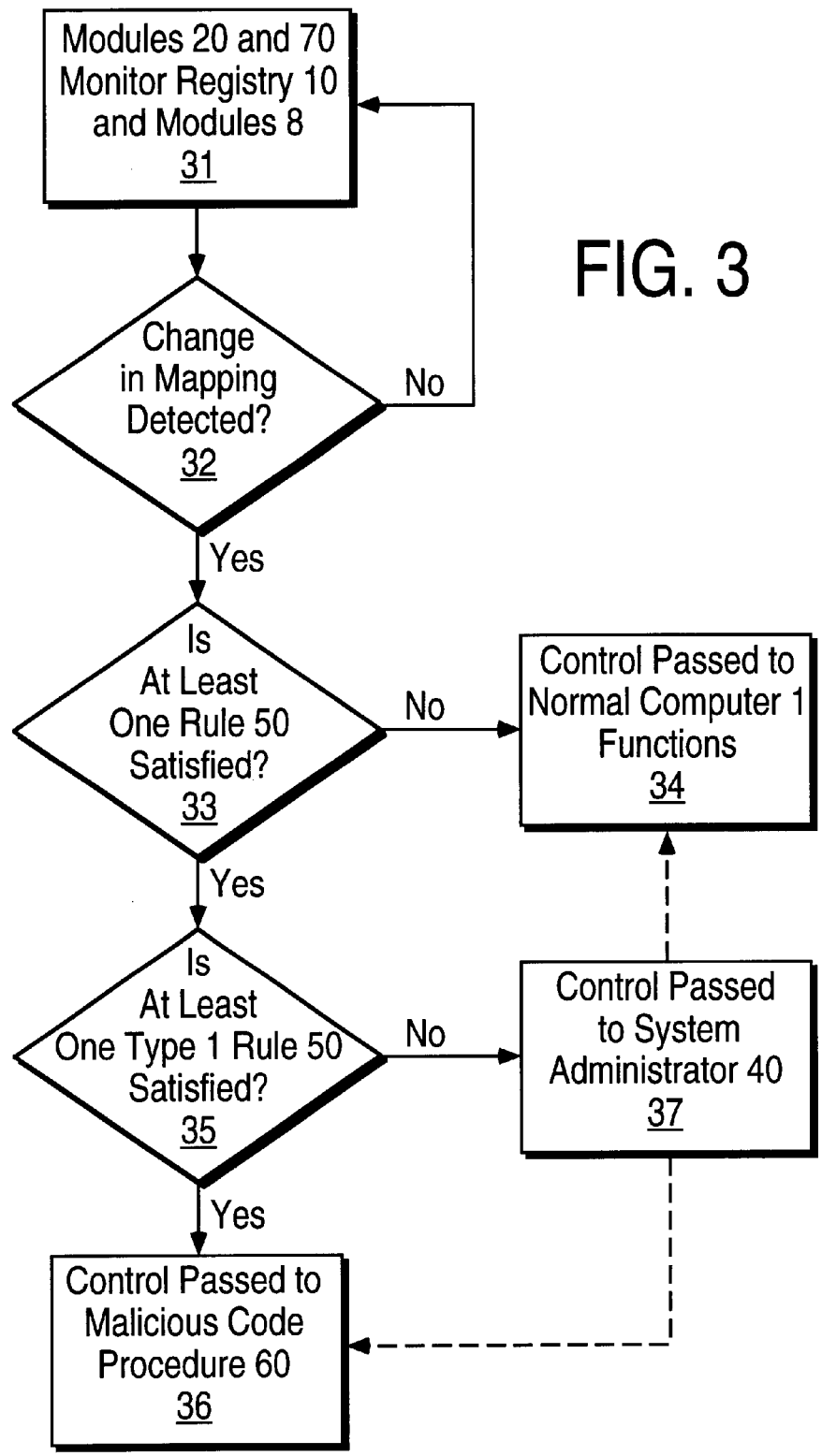
FIG. 3 is a flow chart showing method steps performed in a preferred embodiment of the present invention.

FIG. 3 illustrates a typical method for implementing the present invention. The method starts, at step 31, with file system monitor module monitoring map-loaded modules 8 for changes in mappings of the first kind and registry monitor module 20 monitoring registry 10 for changes in mappings of the second kind. This step 31 can be invoked whenever the operating system of computer 1 boots up or at any later time.

When modules 70 or 20 detect such a change in mapping (at step 32), control is passed to programmable control module 30. If no change in mapping is detected, modules 70 and 20 continue monitoring until asked to stop, e.g., when computer 1 is shutdown.

At step 33, module 30 determines whether at least one rule 50 is satisfied by the detected change in mapping. If the answer to this question is no, module 30 has in essence determined that the change in mapping was innocent, and module 30 passes control to the normal functioning of computer 1 (step 34). If, on the other hand, module 30 determines that at least one rule 50 is satisfied, module 30 goes on to make the additional determination (at step 35) as to whether at least one type 1 rule 50 is satisfied. If the answer to this question is yes, module 30 has in essence determined that a malicious code attack has occurred, and module 30 passes control to the set of malicious code attack procedures 60 (step 36).

If, on the other hand, module 30, at step 35, determines that no type 1 rule 50 has been satisfied, it is now known that the only type of rule 50 that has been satisfied is a type 2 rule. Thus, module 30 passes control to system administrator 40 (at step 37) to make the human decision as to whether the rule 50 that has been satisfied is sufficiently serious, taking into account the totality of the circumstances surrounding the satisfaction of the rule 50, to warrant a declaration that a malicious code attack has occurred. System administrator 40 passes control either to step 36 or to step 34 based upon his or her decision.

Typically, module 30 or administrator 40 makes the determination that a malicious code attack has occurred when at least one rule 50 is satisfied. However, it could be pre-established that two (or more than two) rules must be satisfied before such a determination is made.

We will now describe several typical rules 50 that can be used in conjunction with the present invention. These rules 50 are merely exemplary; many other rules 50 could be used in any given installation.

Rule 50(1): In this example, there is an original map-loaded module 8 that has been digitally signed by a first author. By "digitally signed", we mean electronically signed using a technique of public key cryptography. Rule 50(1) provides that module 20 or module 70 detects a change in mapping in favor of a map-loaded module 8 that is digitally signed by a second author who is not deemed to be in a trusted relationship with respect to the author of a digital signature associated with the map-loaded module 8 being unmapped. In this case, the implementers of the present invention have encoded into pre-established rule 50(1) a set of criteria for determining when the second author is in a trusted relationship with respect to the first author. Such criteria can include, for example: (a) the second author is the same as the first author; (b) the first and second authors are corporations, and the second author is a parent or wholly owned subsidiary of the first author; (c) the first and second authors appear on a pre-established list of acceptable trusted authors; or (d) any other criterion for defining a trusted relationship. For this rule 50(1), module 30 can verify the digital signatures in question, and thus verify the identities of the authors, by conventional techniques of public key cryptography and public key infrastructures. This may entail, for example, examining a digital certificate digitally signed by a trusted third party separate and apart from the first and second authors.

Rule 50(2): In this example, there is no original map-loaded module 8: the change in mapping is the introduction of a new map-loaded module 8 into registry 10. This event can be detected by either module 20 or module 70. Rule 50(2) provides that the new map-loaded module 8 is not digitally signed, or is digitally signed by someone not on a pre-established approved list.

Rule 50(3): The change in mapping entails an original map-loaded module 8(1) and a replacement map-loaded module 8(2). The change in mapping can be either of the first kind or second kind, and thus can be detected by either module 70 or module 20. Module 8(1) has a pathname of PATHNAME1, and module 8(2) has a pathname of PATH-NAME2. In this case, rule 50(3) provides that the replacement map-loaded module 8(2) is a newer version of the original map-loaded module 8(1), and PATHNAME2 is different than PATHNAME1. The reason that this rule 50(3) makes sense in certain circumstances is that if a legitimate piece of software is updating a certain module 8 with a new version, the pathnames of the old and new modules 8 typically are the same. However, if the software doing the replacement of module 8 is malicious software, said software may very well be placing the malicious code into a new location 5.

Rule 50(4): Rule 50(4) can be invoked whenever a new or replacement map-loaded module 8 is sought to be loaded within the set of map-loaded modules 8 and mapped by registry 10. This event is detectable by both detection modules 70, 20. A malicious code scan is performed on the new or replacement map-loaded module 8, e.g., by antivirus scanning software. In this case, rule 50(4) provides that the malicious code scan determines that the new map-loaded module 8 contains a virus, a trojan, or a worm.

The above description is included to illustrate the operation of the preferred embodiments, and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. Computer apparatus comprising:
   an intermediate location containing mappings from generic map-loaded module names to specific locations of map-loaded modules;
   coupled to the intermediate location and to the map-loaded modules, a monitor adapted to monitor changes in mappings from the intermediate location to the map-loaded modules; and
   coupled to the monitor, a programmable control module adapted to make a determination that a change in mapping is deemed to constitute a malicious code attack when at least one pre-established rule is satisfied.

2. The apparatus of claim 1 wherein the monitor comprises:
   an intermediate location monitor module adapted to monitor attempts to replace existing mappings of map-loaded modules with replacement mappings; and
   a file system monitor module adapted to monitor attempts to insert new map-loaded modules into the computer.

3. The apparatus of claim 1 wherein the computer is coupled to a computer network.

4. The apparatus of claim 1 wherein there are two categories of rules embodied within the programmable control module:
   a first category of rules having a characteristic that the programmable control module makes said determination by itself whenever at least one of said first category of rules is satisfied; and
   a second category of rules having a characteristic that whenever at least one of said second category of rules is satisfied, the programmable control module allows said determination to be made by a system administrator.

5. The apparatus of claim 1 wherein the change in mapping is an attempt to register a new map-loaded module with the intermediate location.

6. The apparatus of claim 1 wherein the change in mapping is an attempt to replace a mapping to an original map-loaded module with a mapping to a replacement map-loaded module.

7. The apparatus of claim 1 wherein at least one map-loaded module is a COM (component object model).

8. The apparatus of claim 1 wherein at least one map-loaded module is a software driver.

9. The apparatus of claim 1 wherein the change in mapping involves an original map-loaded module and a replacement map-loaded module; and
   one rule is that:
       the original map-loaded module is digitally signed by a first author; and
       the replacement map-loaded module is digitally signed by a second author who is not in a trusted relationship with respect to the first author.

10. The apparatus of claim 1 wherein the change in mapping involves a new map-loaded module; and
    one rule is that: the new map-loaded module is not digitally signed by someone on a pre-established approved list.

11. The apparatus of claim 1 wherein the change in mapping involves an original map-loaded module having a first pathname and a replacement map-loaded module having a second pathname; and
    one rule is that:

the replacement map-loaded module is a newer version of the original map-loaded module; and the second pathname is different than the first pathname.

12. The apparatus of claim 1 wherein the change in mapping involves a candidate map-loaded module;

a malicious code scan is performed on the candidate map-loaded module; and one rule is that:

the malicious code scan determines that the candidate map-loaded module contains at least one item from the group of items comprising a virus, a trojan, and a worm.

13. A computer-implemented method for thwarting map-loaded module masquerade attacks on a computer having an intermediate location containing mappings from generic map-loaded module names to specific locations of map-loaded modules, said method comprising the steps of:

monitoring changes in mappings that occur between the intermediate location and the map-loaded modules; and determining that a change in mapping is deemed to constitute a malicious code attack when at least one pre-established rule is satisfied.

14. The method of claim 13 wherein the monitoring step comprises the substeps of:

monitoring attempts to insert new map-loaded modules into the computer; and monitoring attempts to replace existing mappings of map-loaded modules with replacement mappings.

15. The method of claim 13 wherein the determining step comprises the substeps of:

determining whether the at least one pre-established rule that is satisfied is of a first type or a second type;

when at least one rule of the first type is satisfied, declaring that a malicious code attack has occurred; and when at least one pre-established rule has been satisfied, but no rule of the first type has been satisfied, passing control to a system administrator to make a decision as to whether a malicious code attack has occurred.

16. A computer-readable medium used in conjunction with a digital computer having an intermediate location containing mappings from generic map-loaded module names to specific locations of map-loaded modules, said computer-readable medium containing computer program instructions for performing the steps of:

monitoring changes in mappings that occur between the intermediate location and the map-loaded modules; and determining that a change in mapping is deemed to constitute a malicious code attack upon the computer when at least one pre-established rule is satisfied.

17. The apparatus of claim 1 wherein the intermediate location is a registry.

18. The computer-implemented method of claim 13 wherein the intermediate location is a registry.

19. The computer-readable medium of claim 16 wherein the intermediate location is a registry.

* * * * *